(12) United States Patent
Cox et al.

(10) Patent No.: US 7,607,369 B2
(45) Date of Patent: Oct. 27, 2009

(54) CONDUIT GUIDE CLIP

(75) Inventors: Marvin Cox, Wichita, KS (US);
Anthony F. Beugelsdyk, Wichita, KS (US)

(73) Assignee: Wescon Products Company, Wichita, KS (US)

( * ) Notice: Subject to any disclaimer, the term of this patent is extended or adjusted under 35 U.S.C. 154(b) by 286 days.

(21) Appl. No.: 11/738,185

(22) Filed: Apr. 20, 2007

(65) Prior Publication Data

US 2008/0257093 A1 Oct. 23, 2008

(51) Int. Cl.
*F16C 1/25* (2006.01)
(52) U.S. Cl. .............. 74/502.6; 74/502.5; 74/500.5; 403/353; 248/71; 248/73; 172/121
(58) Field of Classification Search .............. 74/502.5, 74/502.6, 500.5; 403/353; 248/65, 71, 73; 172/121; *F16C 1/26*
See application file for complete search history.

(56) References Cited

U.S. PATENT DOCUMENTS

| | | | |
|---|---|---|---|
| 639,337 A | 12/1899 | Anthony | |
| 1,296,042 A | 3/1919 | Bralove | |
| 2,655,703 A | 10/1953 | Flora | |
| 3,491,971 A | 1/1970 | Fisher | |
| 3,893,647 A * | 7/1975 | Kennedy | 248/68.1 |
| 3,995,512 A | 12/1976 | Johnsen | |
| 4,011,770 A | 3/1977 | Webb | |
| 4,386,752 A | 6/1983 | Pavlak et al. | |
| 4,461,189 A | 7/1984 | Rottenkolber et al. | |
| 4,506,416 A * | 3/1985 | Ohminato et al. | 24/67 R |
| 4,647,241 A | 3/1987 | Weber | |
| 4,823,752 A * | 4/1989 | Uuskallio | 123/400 |
| 5,016,843 A | 5/1991 | Ward | |
| 5,172,878 A | 12/1992 | Lederman | |
| 5,230,257 A | 7/1993 | Nowak | |
| 5,291,910 A | 3/1994 | Bui et al. | |
| 5,553,822 A | 9/1996 | Barnard et al. | |
| 5,570,611 A | 11/1996 | Pospisil et al. | |
| 5,577,415 A | 11/1996 | Reasoner | |
| 5,579,662 A | 12/1996 | Reasoner | |
| 5,605,074 A | 2/1997 | Hall et al. | |
| 5,615,583 A | 4/1997 | Cunningham et al. | |
| 5,632,182 A | 5/1997 | Reasoner | |
| 5,634,379 A * | 6/1997 | Barnard | 74/502.6 |
| 5,803,654 A | 9/1998 | Spease et al. | |
| D409,479 S | 5/1999 | Beugelsdyk et al. | |

(Continued)

FOREIGN PATENT DOCUMENTS

GB 888450 1/1962

*Primary Examiner*—Richard W L Ridley
*Assistant Examiner*—Timothy J Murphy
(74) *Attorney, Agent, or Firm*—Hovey Williams LLP

(57) ABSTRACT

A conduit guide clip is provided which includes a receiver and a single arm extending therefrom is provided for mounting to a tubular support such as the handlebar of a walk-behind lawn mower. The guide clip further includes a mounting post, which is inserted into a hole in the tubular support. The arm is curved to wrap around and clamp an arcuate inner surface of the receiver against the tubular support after installation. The mounting post is positioned to extend from the arcuate inner surface, and the arm includes a rearwardly swept remote edge and located whereby no portion of the arm is positioned to intersect the longitudinal axis of the mounting post.

15 Claims, 4 Drawing Sheets

U.S. PATENT DOCUMENTS

| | | | |
|---|---|---|---|
| 6,023,993 A * | 2/2000 | Beugelsdyk et al. | 74/502.6 |
| D425,784 S | 5/2000 | Beugelsdyk et al. | |
| 6,725,978 B2 * | 4/2004 | Karpowich | 74/489 |
| D570,207 S * | 6/2008 | Cox et al. | D8/396 |

* cited by examiner

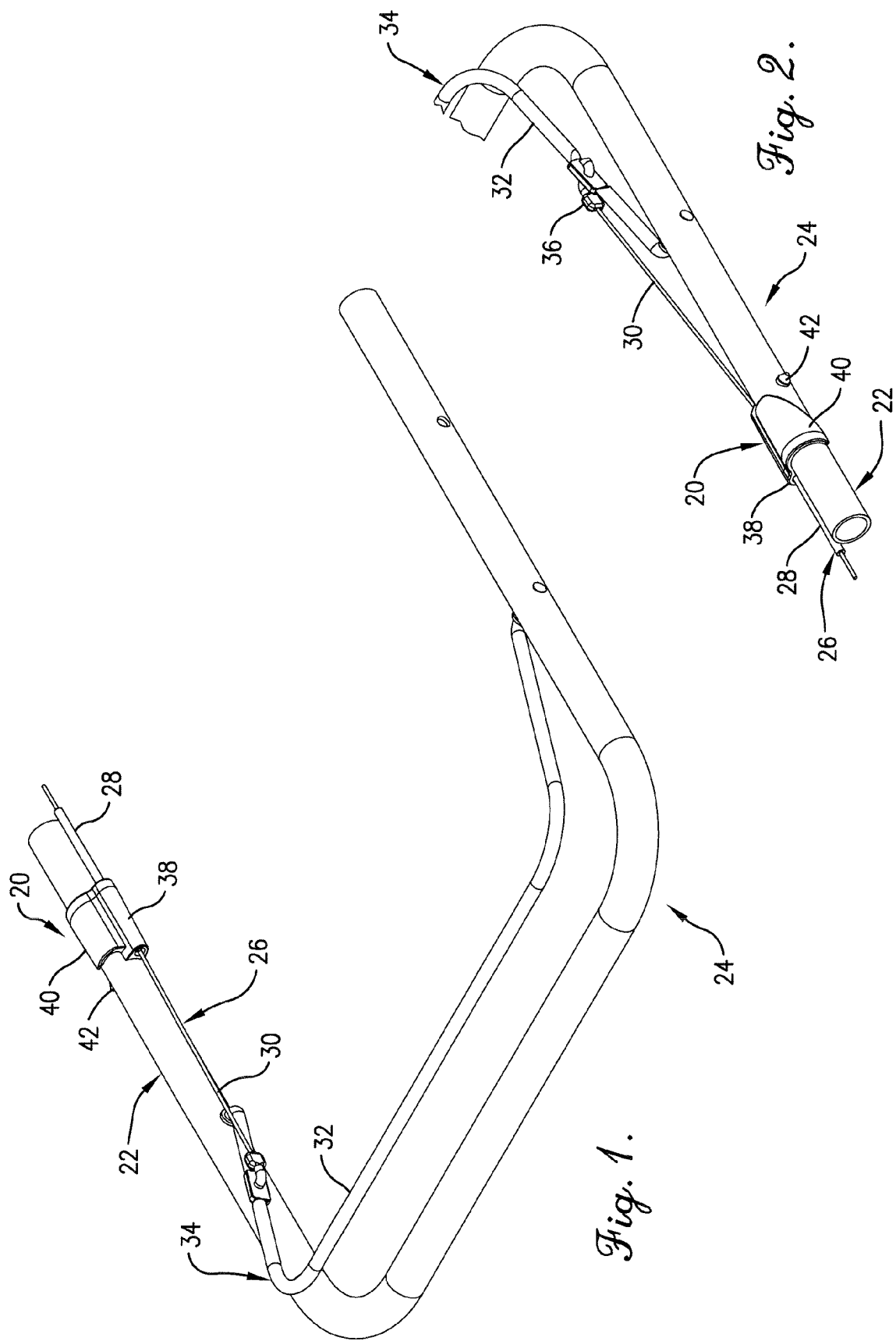

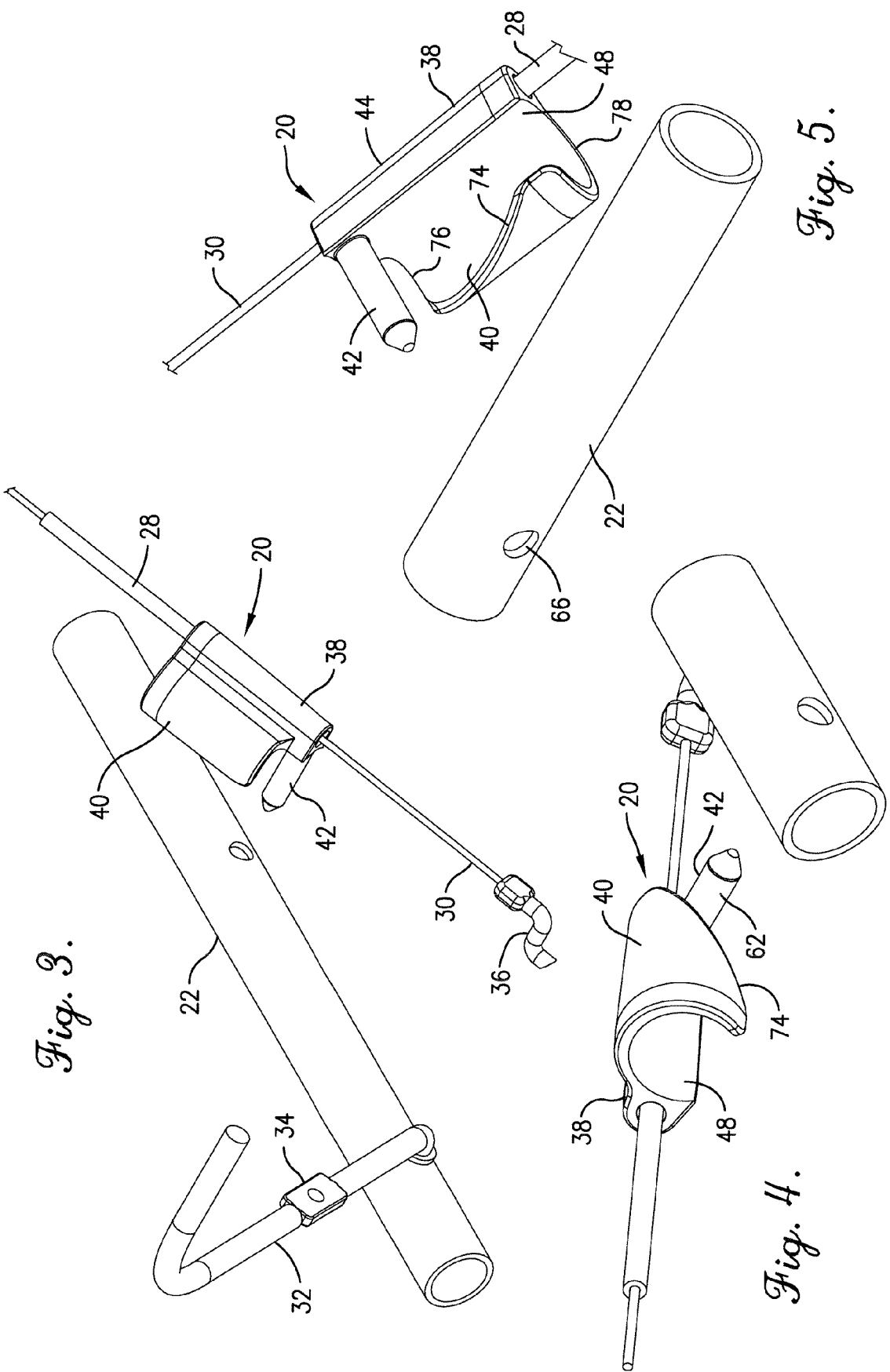

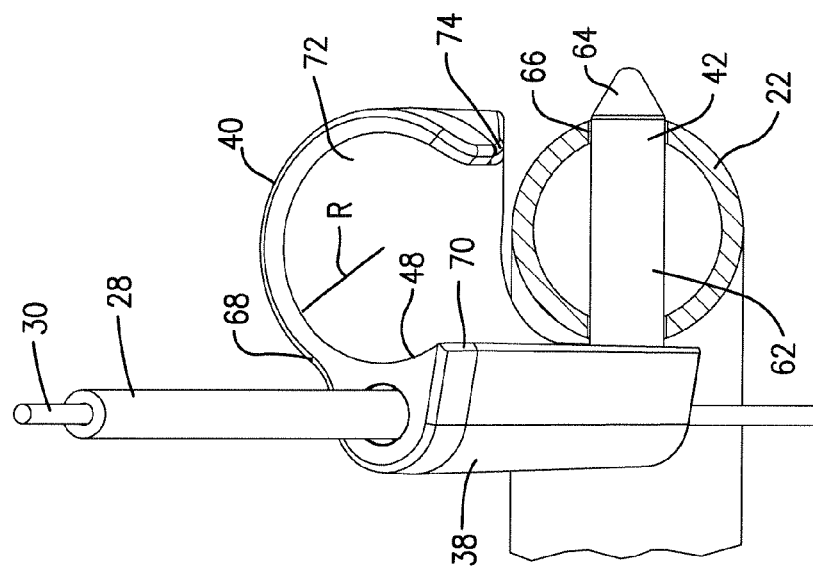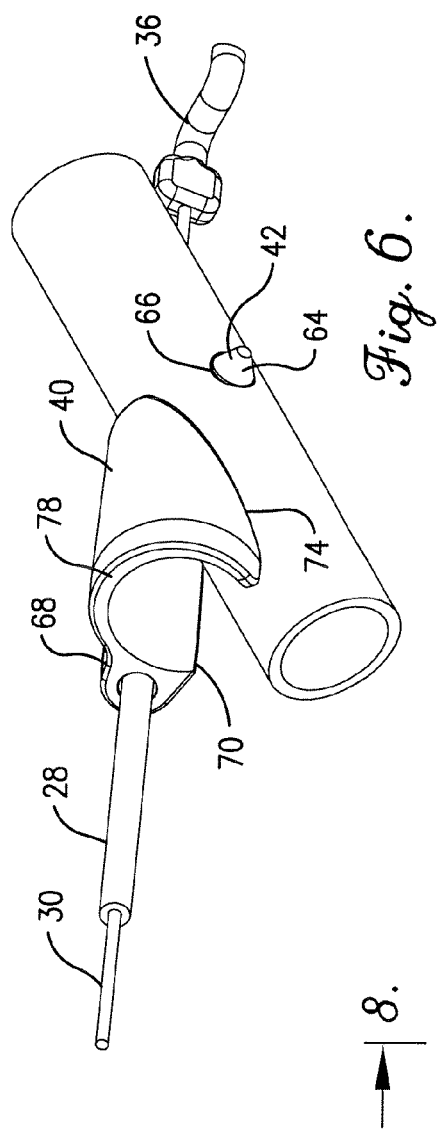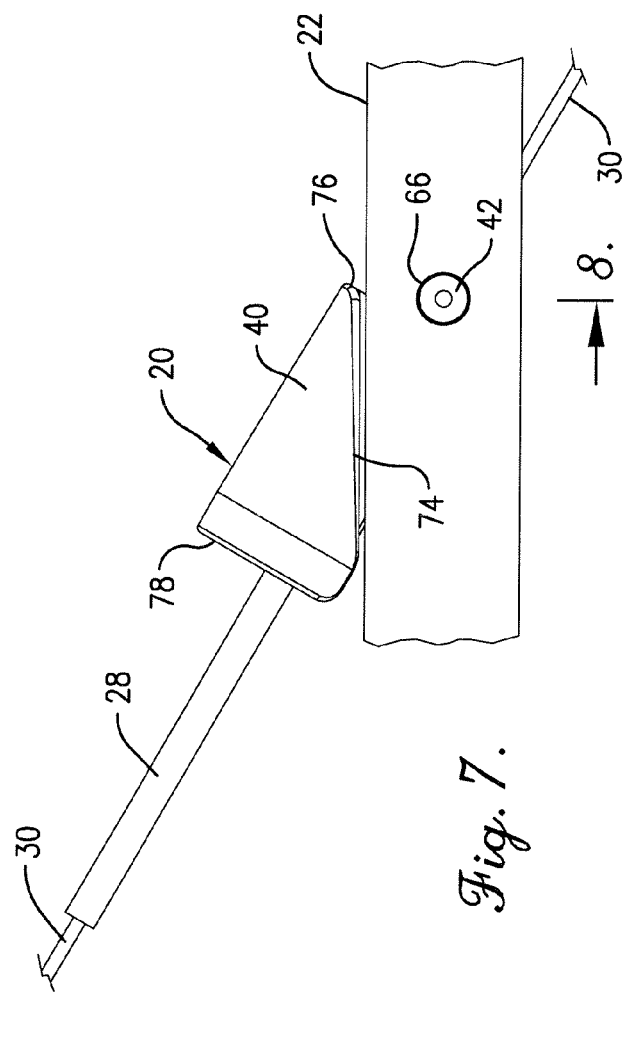

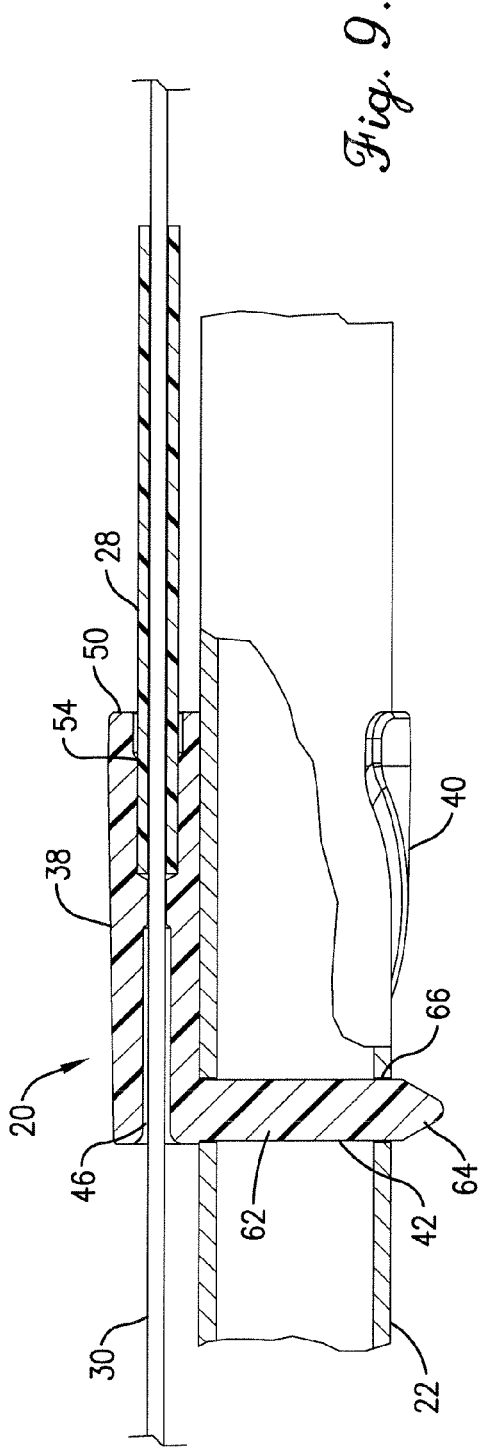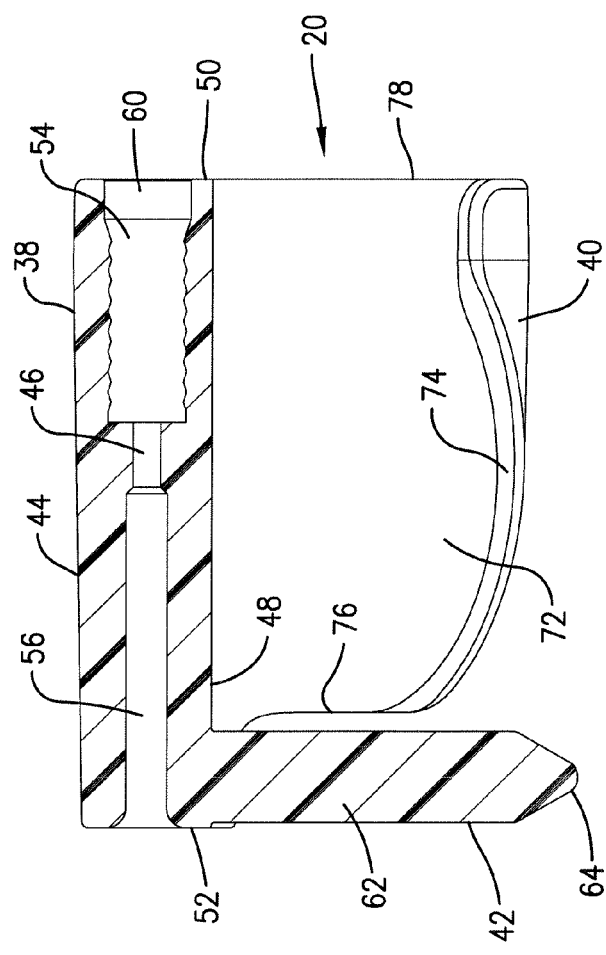

CONDUIT GUIDE CLIP

BACKGROUND OF THE INVENTION

1. Field of the Invention

The present invention concerns a clip intended for mounting to a handlebar or the like to guide and inhibit fouling of control cables. More particularly, it is concerned with a guide clip which may be molded into a unitary member and facilitates easy mounting to a handlebar and retention in its desired location by a mounting post positioned generally axially forward of the portion of the swept and arcuate leading edge of an attachment arm which, absent such a swept characteristic, would otherwise be opposite to the mounting post.

2. Description of the Prior Art

One challenge presented in the design of products having a control mechanism positioned remotely from a controllable mechanism such as an engine throttle or clutch is the routing of the control cable connecting the control and the controllable mechanism. Because the control cable is flexible and may need to extend a considerable distance, there is often a need for an intermediate guide positioned between the control and the controllable mechanism. For example, in a walk-behind lawn mower, the mower engine is mounted on a mower deck and the control for the throttle, deadman lever, blade brake or clutch is often positioned on a handlebar within easy reach of the operator. It is often desirable that the guide be mounted on the mower's handlebar intermediate the control and the engine throttle, deadman lever, blade brake, clutch mechanism or the like. Such a guide may serve several functions, but a principal one is to route the cable in such a way that it does not catch or bind on foreign objects as the mower passes, or droop such that it might catch on a wheel or deteriorate if it were to touch a hot engine surface.

In the past, several approaches have been developed to meet the challenge of having an economical, durable and effective cable guide. One such guide is shown, for example, in U.S. Pat. No. 5,553,822, entitled Support Means for Conduit, the disclosure of which is incorporated herein by reference. The guide shown therein presents a simple solution for providing intermediate support to a control cable by providing a helical coil of wire which wraps around the sheath of the cable and has a pair of arms for fastening the coil to a structural support such as, for example, a handlebar. While a simple and elegant solution, the coiled wire presents economic challenges when the cable is supplied separately and must be inserted into the coil at a later date.

Another approach to providing a conduit guide is shown in U.S. Pat. No. 5,803,654 to Spease entitled Control Cable Mounting System, the disclosure of which is incorporated herein by reference. As described in this patent, a cable positioning and retaining member is provided with a pair of opposed, arcuate flanges which are designed to extend oppositely from the positioning and retaining member, with a post extending from the positioning and retaining member between the flanges. While this system provides a unitary member for positioning the cable which may be mounted to a handlebar, considerable force may be required to spread the flanges and the hole in the handlebar for receiving the post is not readily visible during the attachment of the system to the handlebar.

U.S. Pat. No. 6,023,993 entitled Conduit Guide Fitting, the disclosure of which is incorporated herein by reference, presents an alternative approach to supporting a control cable. Here, a receiver is provided with a projection which is structured to enter an opening in a handlebar. Rather than fixedly grasping the handlebar, this fitting is designed to permit pivoting during both mounting and as the cable moves during operation.

U.S. Design Pat. Nos. 409,475 and D425,784 both entitled Conduit Guide Clip and both being incorporated herein by reference, show further cable retaining clips. Each of these design patents show one or a pair of cable receivers positioned at a circumferential, as opposed to axial, end of an arcuate mounting band. A post extends radially inwardly from a location remote from the receivers, and generally at an intermediate location along the band. While the clips shown in these design patents are both useful and attractive, they retain at least some of the disadvantages referenced in regard to the U.S. Pat. No. 5,803,654 patent referenced above.

Thus, there has arisen a need for an improved cable guide clip. It is a goal of the present invention to provide a guide clip which is relatively rigidly mountable on a handlebar. Preferably, such a guide clip would resist movement relative to the handlebar such as shifting axially along the handlebar or rotation relative to the handlebar. It is another goal of the present invention to provide a guide clip which may be molded into a unitary member and is economical both to manufacture and install. It is a further goal to provide a durable conduit guide clip which may be more readily installed on a handlebar by the installer with less force.

SUMMARY OF THE INVENTION

These and other objects have largely been met by the conduit guide clip of the present invention. That is to say, the conduit guide clip hereof presents an article which can be molded of synthetic resin as a unitary member, is economical and durable, provides a relatively rigid attachment to a handlebar or other tubular support, and facilitates attachment by the installer, preferably by enabling the guide clip to substantially slide onto the tubular support. Furthermore, the guide clip hereof resists movement relative to the handlebar during normal operation when shifting of the cable may result in a moment arm between a receiver for the control cable and the longitudinal axis of the handlebar.

Broadly speaking, the present invention includes a cable receiver which includes an elongated passage oriented generally parallel to the axis of the handlebar to which the guide clip is to be mounted. The passage is configured to present a larger bore for receiving the sheath of a Bowden cable extending a portion of the axial extent of the passageway, while a narrower segment of the passage permits only the control cable extending from the sheath to pass therethrough. An arm has a remote edge which extends in an arcuate manner from only one side of the cable receiver, the arm having a front edge which is positioned rearwardly of a transverse plane through a post, with the remote edge extending rearwardly from the front edge. The remote edge is gradually increasing in its axial extent from a narrowed portion to a wider portion. As a result, a remote edge in the axial direction of the arm is swept and substantially spirals as it makes its arcuate curve in a circumferential direction approximating the diameter of the handlebar to which it is received. A mounting post is located to extend generally radially inwardly relative to and through an opening of a handlebar to which the guide clip is to be mounted. The post is preferably of a sufficient length so that its remote tip extends beyond the inner surface of the arm diametrically facing the cable receiver, and most preferably of a length to extend beyond the outer surface of the arm which lies diametrically opposite the cable receiver. However, because of the swept remote edge characteristic of the arm, a portion of which preferably extends at least about 180° circumferentially from the side of the receiver distal to the arm, the mounting post is exposed with no part of the arm being positioned to extend from an opposite side of the receiver nor does any portion of the arm lie in intersecting relationship to the axis of the mounting post.

As a result, the guide clip hereof may be more easily be mounted to the handlebar or other tubular support than conventional guide clips, without the need for tools, while still remaining economical, durable in use, and provided a relatively rigid and fixed mounting location for the control cable. In the first instance, it is relatively easy for the installer to visually track the mounting post as it enters a complementally configured receiving hole in the tubular support. By first locating the mounting post in the receiving hole, the guide clip is initially at an acute angle relative to the longitudinal axis of the tubular support. The exposed aspect of the guide clip, having only one clasping arm which has a swept remote edge and a front edge rearward of and which does not intersect a plane extending longitudinally from the post, enables the user to insert the mounting post, which preferably extends substantially diametrically through two opposed openings in the arcuate wall of the tubular handlebar without interference. The guide clip is then easily installed by simply pivoting the guide clip on the mounting post whereby the handlebar snaps into place between the arm and the cable receiver. Thus, the longitudinal axis of the cable receiver is substantially parallel to the longitudinal axis of the handlebar to reduce torsional forces. When the cable is actuated, most of the forces imparted by the cable to the clip are parallel to the axis of the handlebar. The arm and cable receiver help to resist dislodgement of the guide clip, and the mounting post resists movement longitudinally along the longitudinal axis of the handlebar as well as rotational movement of the guide clip in a circumferential direction around the handlebar.

During mounting of the guide clip, the arm, being flexible, yields more readily because of the swept remote edge, and requires less force to spread the arm until the handlebar or other tubular support is fully seated against the inner surface of the receiver. Thus, the guide clip hereof requires less force to attach to a tubular support than conventional structures for holding a conduit in place, and preferably largely slides into the desired coupled position. In this position, an arcuate inner surface of the receiver of the guide clip lies against the tubular support with the passage of the receiver substantially parallel to the longitudinal axis of the tubular support, while the single arm wraps around and essentially enfolds and clamps the tubular support to the receiver and resist dislodgement. The mounting post, being fully received in the hole of the tubular support and of a length sufficient to extend diametrically therethrough, resists relative circumferential movement as well as relative axial movement between the guide clip and the tubular support.

These and other advantages will be readily apparent to those skilled in the art with reference to the drawing figures and the description of the preferred embodiments which follow.

BRIEF DESCRIPTION OF THE DRAWINGS

FIG. 1 is a fragmentary right rear perspective view of a lawnmower having a handlebar mounting a control coupled to a control cable and a guide clip in accordance with the present invention being mounted on the handlebar and receiving the control cable therethrough;

FIG. 2 is a fragmentary left front perspective view of a portion of the handlebar, control, cable and guide clip of FIG. 1 showing a remote edge of the guide clip and the tip of the mounting post of the guide clip extending diametrically through openings in the handlebar;

FIG. 3 is an enlarged fragmentary perspective view of the lawnmower handlebar and the actuatable control mounted thereto as shown in FIG. 1, but showing the guide clip in accordance with the present invention prior to mounting with the control cable extending therethrough;

FIG. 4 is an enlarged fragmentary left front perspective view showing the arcuate arm extending in a circumferential configuration prior to mounting of the post to the handlebar;

FIG. 5 is an enlarged bottom left front perspective view showing the position of the front edge of the arm located rearward of a plane extending perpendicular to the axis of the cable receiver and through any part of the mounting post;

FIG. 6 is an enlarged left front perspective view similar to FIG. 4 but showing the mounting post extending through the opposed holes in the wall of the handlebar but prior to bring the guide clip into a seated position with the passage through the cable receiver located substantially parallel to the longitudinal axis of the handlebar;

FIG. 7 is an enlarged side elevational view of the guide clip in the position shown in FIG. 6;

FIG. 8 is a front elevational view in partial section taken along line 8-8 of FIG. 7 to show the guide clip in elevation when the post is inserted through the opposed holes in the wall of the handlebar, showing the arm extending from only one side of the cable receiver;

FIG. 9 is a view in partial cross-section taken through the cable receiver and the mounting post when mounted to the handlebar to show the control cable and sheath, and the relative parallel orientation of the control cable and the longitudinal axis of the handlebar; and FIG. 10 is an enlarged cross-sectional view similar to FIG. 9 with the control cable removed to show the configuration of the passage through the cable receiver.

DESCRIPTION OF THE PREFERRED EMBODIMENT

Referring now to the drawings, a conduit guide clip 20 in accordance with the present invention is shown in FIG. 1 mounted to a tubular support 22 such as a handlebar of a walk-behind lawn mower 24 or other powered equipment (e.g., a tiller, aerator, or the like) having a controllable member. The mower 24 is provided with a control cable system 26, provided as a Bowden cable having a sheath 28 and a control cable 30, and the control cable 30 extends between a remote end operatively connected to the controllable member such as an engine throttle, clutch or the like and a proximate end which is operatively connected to a control 34 which is preferably also mounted to the tubular support. The control 34 has a shiftable member 32 to which a proximate end 36 of the control cable 30 is attached for actuating the controllable member. In the drawings shown herein, the control 34 is shown as a deadman bail of a lawn mower, with the bail pivotally mounted to the mower to actuate a blade brake of the mower in the event that the user releases a grip on the bail, but it is to be understood a variety of different controls and controllable members could benefit from the use of the cable guide hereof. Thus, the conduit guide clip 20 is positioned intermediate the controllable member and the control 34.

FIGS. 2-10 illustrate the guide clip 20 in greater detail, the guide clip 20 broadly including a receiver 38, an arm 40, and a mounting post 42. The guide clip 20 is preferably molded of synthetic resin such as polyethylene as a unitary member.

The receiver 38 includes an elongated body 44 having a passageway 46 extending axially therethrough. An inner surface 48 of the receiver 38 is configured complemental to the shape of the exterior of the tubular support 22, which is usually substantially circular in cross-section, and thus the inner surface 48 preferably has an arcuate configuration sized to fit in engagement with the arcuate outer surface of the tubular support 22. The passageway extends axially through the receiver body 44 from a rear end 50 of the body 44 to a front end 52 thereof The passageway 46, best seen in FIGS. 9 and 10, includes a larger bore 54 at the rear end 50 and extending a portion of the axial length of the passageway 46, with remaining portion being a narrower segment 56 extending to the front end 52 of the body. The larger bore 54 is preferably circular in cross-section, and sized to receive the sheath 28 therein. However, the narrower segment 56 is of a lesser transverse dimension as seen in FIGS. 9 and 10, and thus while sufficient for the control cable 30 to pass therethrough, the sheath 28 is unable to extend into the narrower segment 56. The larger bore 54 may have a front segment 60 of an even larger transverse dimension as seen in FIGS. 9 and 10, which both helps to guide the sheath during insertion into the passageway, and also may accept a fitting such as a terminal attached to the proximate end of the sheath.

The mounting post 42 extends perpendicular to the longitudinal axis of the passageway 46, and has a shaft 62 and a rounded nose 64. The shape and transverse dimension of the shaft 62 is most preferably substantially constant or slightly tapered for molding and thus helps to resist movement when fully inserted during mounting. The transverse dimension of the shaft 62 is thus sized to snugly fit within the hole 66 in the tubular support 22. This facilitates thin initial insertion of the mounting post into the hole 66 and permits the mounting post 42 to be first inserted, then serve as a pivot for attachment of the receiver and arm as shown in FIGS. 6, 7 and 8 to facilitate attachment of the guide clip 20 to the tubular support 22. The mounting post 42 is positioned to extend from the arcuate inner surface 48 and is positioned axially between the front end 52 and the rear end 50, and most preferably proximate the front end 52.

The arm 40 extends from only one lateral side 68 of the receiver 38, leaving a free edge 70 on the opposite side of the receiver. In this regard, the free edge 70 is a part of the receiver 38 and no arm extends therefrom, as may be seen in FIG. 8 taken along the longitudinal axis of the tubular support 22. An inner arm surface 72 of the arm 40 extends in an arcuate path from the receiver and configured complimental to an outer surface of the tubular support 22 so as to extend circumferentially. Prior to attachment to the tubular support 22, the inner arm surface 72 has a progressively reducing radius R from the center of a circle defined by the inner surface 48, as the arm 40 extends from the lateral side 68 of the receiver 38 to its remote edge 74 which is preferably swept rearwardly and outwardly. Because the arm 40 is resilient, it thus flexes during installation on the tubular support 22 and exerts a clamping force in a radial direction once mounted on the tubular support 22.

The arm 40 presents a front edge 76 which is best seen in FIGS. 3 and 10 and extends outwardly from the one lateral side of the receiver 38. Most preferably, the front edge extends along an arcuate path which is circumferential to receive the tubular support, and is oriented along a plane which lies substantially perpendicular to the longitudinal axis of the passageway. Moreover, the front edge 76 is most preferably located rearwardly of the mounting post 42. The remote edge 74 is swept rearwardly and outwardly from the front edge 76 to a trailing edge 78. The trailing edge 78 also most preferably positioned to extend around a part of the outer surface of the tubular support and this extends along an arcuate path. The trailing edge 78 is also most preferably oriented to extend from the receiver 38 along a plane which is substantially perpendicular to the longitudinal axis of the passageway. Thus, the trailing edge 78 begins at the one lateral side 68 adjacent the rear end 58 of the body 42. As may be seen in FIG. 8 viewed along the longitudinal axis of the tubular support 22 and thus also the longitudinal axis of the passageway when the guide clip 20 is fully mounted, the arm 40 extends slightly more than 180° circumferentially from the junction of the arm to the receiver 38 at its lateral side 68 to the remote edge 74 of the arm 40, and also the remote edge 74 of the arm 40 is more than 180° circumferentially from both the passageway 46 and the mounting post 42 where it connects to the inner surface 48. The remote edge 74 is thus more proximate to the free edge 70, the passageway 46 and the base of the mounting post 42 than to the lateral side 68 of the receiver 38.

The mounting post 42, extending perpendicular to the inner surface 48, is positioned forwardly of that part of the front edge 76 when a plane is drawn from any portion of the mounting post in a direction perpendicular to the longitudinal axis of the passageway 46. This is best seen in FIGS. 5 and 6, where the hole 66 in the tubular support 22 illustrates the corresponding axial extent of the mounting post 42, it being readily seen that the corresponding portion of the front edge 76 is located well to the rear of the hole 66 when mounted, and thus also the mounting post 42.

Conceptually, the guide clip 20 hereof (disregarding the mounting post 42) can be analogized in terms of shape to a jet aircraft with only one wing and no tail structure, that wing being curled as it extends from the fuselage. In that analogy, the receiver 38 compares with the fuselage of the jet aircraft which has its jet engine extending axially therethrough, the passageway 46 corresponding to the air intake and exhaust. The arm 40 then corresponds with the swept wing of an aircraft having a short forward edge, a longer trailing edge, and a remote edge which sweeps outwardly and rearwardly from the forward edge to the trailing edge, with the wing (here the arm 40) being curled in an arcuate manner as it extends from the fuselage.

In a typical use application on a lawn mower 24, the assembler is typically provided with a tubular support 22 having a hole 66 as illustrated in FIGS. 2, 4, 5, 6 and 7, a control cable system 26 initially connected to a throttle or the like, a control 34 and clip 20. The assembler installs the clip 20 by first locating the nose 64 of the mounting post 42 in the hole 66 as illustrated in FIGS. 6, 7 and 8. This operation and the eye-hand coordination of the installer is facilitated by the ability to visually follow the nose 60 as it enters the hole. Then, the installer may fully insert the mounting post 42 into the hole, whereby the as illustrated in FIG. 7, in a direction transverse to the longitudinal axis of the tubular support. This enables the shaft 62 to fully enter the hole before the arm 40 contacts the tubular support 22. Also, the front edge 76 need not engage the tubular support 22 in order to fully insert the mounting post 42 into the hole 66. In addition, the remote edge 74 essentially lies along the tubular support 22, as shown in FIG. 7 as the arm 40 gradually engages the tubular support. In this manner, the load applied to spread the arm and allow it to expand and then snap around the tubular support is substantially spread along the entire length of the arm 40, and the arm 40 need not exhibit a great displacement in order to receive the tubular support past the remote edge 74. Thus, the stress due to flexing of the arm 40 is spread over a relatively large area and not concentrated along a single point where the receiver 38 connects to the arm 40. As the arm 40 flexes and the outside surface of the tubular support slides along the remote edge 74, the shaft 62 of the mounting post 42 acts as a pivot whereby the clip 20 easily snaps into place against the tubular support 22. Initially, the front end 52 of the receiver 38 is much closer to the outer surface of the tubular support 22 than the rear end 52, but as the mounting post 42 is inserted and the arm 38 spreads, the rear end 52 of the receiver 38 comes closer to the tubular support. When the guide clip 20 is fully mounted as shown in FIGS. 1, 2, and 9, the arcuate inner surface 48 is substantially fully seated against the outer surface of the tubular support 22, with the passageway 46 in alignment with the longitudinal axis of the tubular support 22. The sheath 28 is then inserted into the rear end of the passageway and the control cable 30 is then inserted into the passageway 46 and through the sheath 28, and the control cable exits through the narrower segment 56 to allow it to be attached to the control and the controllable member for then operating the blade brake or other controllable mechanism.

It may be appreciated that the unitary clip 20 is simple to mold of synthetic resin material and requires no tools to install. The effort required to mount the clip onto a tubular support 22 of a complemental configuration is reduced compared to conventional clips for control cables, and resists displacement once fully mounted. By virtue of the fact that there is only one arm 40, that it is provided with a swept remote edge 70, and that it extends from only one side of the receiver 38, the guide clip 20 the hole is seen during insertion and the guide clip gradually slides onto the tubular support 22 as the guide clip easily pivots about the mounting post 42 during installation. As a result, the installer may be subject to less fatigue and the guide clip subject to less stress during installation than has been the case heretofore, all in a single motion which provides economy in regard to the time and cost of labor.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, it is to be understood that the guide clip 20 can be provided as a mirror image for mounting to a right tubular member of the handlebar rather than the left tubular member as shown.

The inventor hereby states his intent to rely on the Doctrine of Equivalents to determine and assess the reasonably fair scope of his invention as pertains to any apparatus not materially departing from but outside the literal scope of the invention as set out in the following claims.

The invention claimed is:

1. A conduit guide clip configured to be mounted on a tubular support having a longitudinal axis and a hole extending through the tubular support, said conduit guide clip comprising:
   a receiver having a free edge, a lateral side, and a longitudinally extending passageway extending along a longitudinal axis therethrough from a front end to a rear end of the receiver;
   a mounting post extending from the receiver and oriented transversely to the longitudinal axis of the passageway; and
   an arcuate arm extending from said lateral side, said arm having a front edge and a trailing edge transverse to said longitudinal axis of said passageway, and a curvilinear edge remote from said lateral side and oblique to said front and trailing edges and extending therebetween, said trailing edge having a length greater than the length of said front edge, there being an arcuate inner surface defined between said receiver and said remote edge which is configured for substantial mating engagement with the tubular support.

2. A conduit guide clip as set forth in claim 1, said arcuate inner surface being oriented substantially parallel to said passageway.

3. A conduit guide clip as set forth in claim 2, said trailing edge being arcuate and lying in a plane substantially perpendicular to the longitudinal axis of the passageway.

4. A conduit guide clip as set forth in claim 3, wherein said front edge is arcuate and lies in a plane substantially parallel to the trailing edge.

5. A conduit guide clip as set forth in claim 4, wherein said mounting post extends from said arcuate inner surface substantially perpendicular to the longitudinal axis of the passageway.

6. A conduit guide clip as set forth in claim 5, wherein said mounting post includes a rounded nose.

7. A conduit guide clip as set forth in claim 1, wherein said mounting post is located more proximate the forward end of the receiver than the rear end of the receiver.

8. A conduit guide clip as set forth in claim 7, wherein said mounting post is located forwardly of a plane extending perpendicular to the passageway along the forward edge of the arm and wherein a longitudinal axis of the mounting post does not intersect the arm.

9. A conduit guide clip as set forth in claim 8, wherein said arm extends circumferentially from said receiver to said remote edge more than 180° from the free edge.

10. A conduit guide clip as set forth in claim 9, wherein said arm extends circumferentially from said receiver to said remote edge more than 180° from said lateral side.

11. A conduit guide clip as set forth in claim 1, wherein said receiver front end extends forwardly of the front edge of the arm and the mounting post.

12. A conduit guide claim as set forth in claim 1, wherein said passageway includes a larger bore proximate the front end and a narrower segment extending rearwardly from the larger bore.

13. A conduit guide clip as set forth in claim 1, wherein said guide clip is of unitary construction and formed of synthetic resin.

14. In combination:
   a powered equipment member having a controllable member and a tubular support, the tubular support having a longitudinal axis and a hole oriented transverse to the longitudinal axis;
   a control operatively mounted to the powered equipment member;
   a control cable system including a sheath and a control cable shiftable within the sheath, said control cable having a proximate end operatively connected to the control; and
   a conduit clip comprising
      a receiver having a free edge, a lateral side, and a longitudinally extending passageway extending along a longitudinal axis therethrough from a front end to a rear end of the receiver;
      a mounting post extending from the receiver and oriented transversely to the longitudinal axis of the passageway; and
      an arcuate arm extending from said lateral side, said arm having a front edge and a trailing edge transverse to said longitudinal axis of said passageway, and a curvilinear edge remote from said lateral side and oblique to said front and trailing edges and extending therebetween, said trailing edge having a length greater than the length of said front edge, there being an arcuate inner surface defined between said receiver and said remote edge which substantially mates with said tubular support,
said mounting post positioned in the hole of said tubular support, and said inner arcuate surface in mating contact with said tubular support, said control cable extending through said passageway.

15. The combination of claim 14, wherein said longitudinal axis is substantially parallel to the longitudinal axis of the tubular member.

\* \* \* \* \*